C. SWAN.
COMBINED LEVELING AND CUSHIONING DEVICE FOR TRACTION ENGINES.
APPLICATION FILED NOV. 17, 1919.
1,348,333. Patented Aug. 3, 1920.
4 SHEETS—SHEET 1.
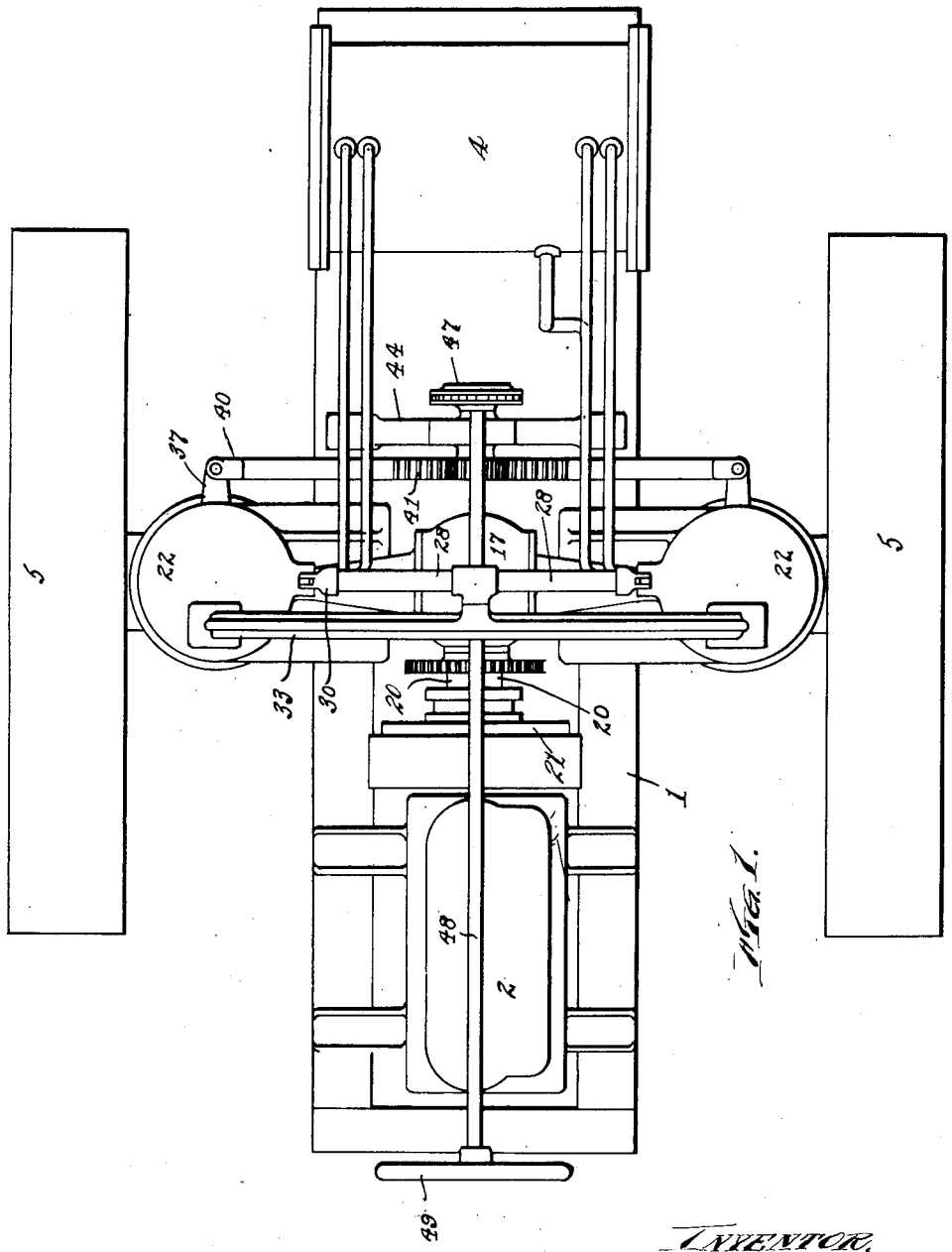

C. SWAN.
COMBINED LEVELING AND CUSHIONING DEVICE FOR TRACTION ENGINES.
APPLICATION FILED NOV. 17, 1919.
1,348,333.
Patented Aug. 3, 1920.
4 SHEETS—SHEET 2.
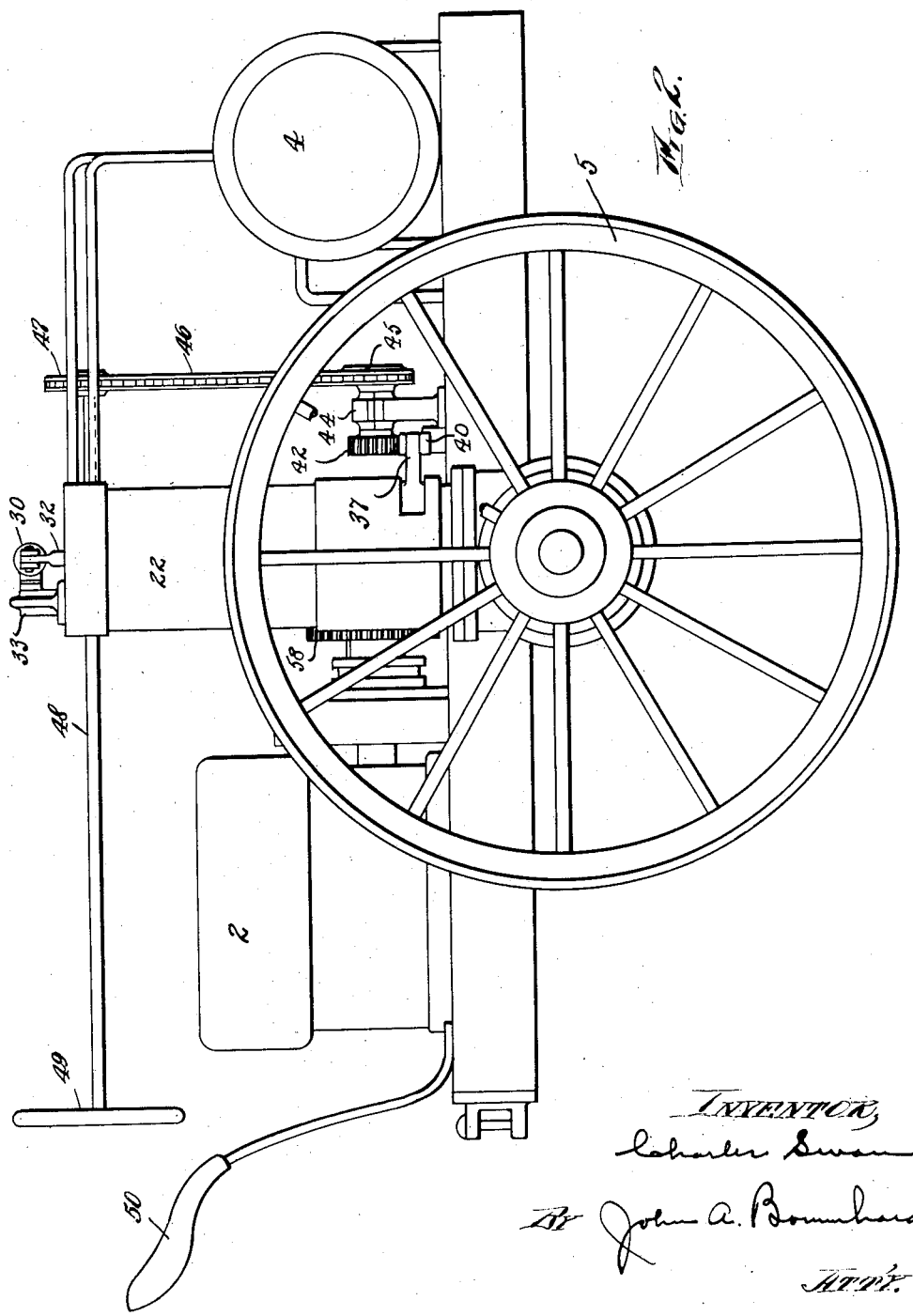

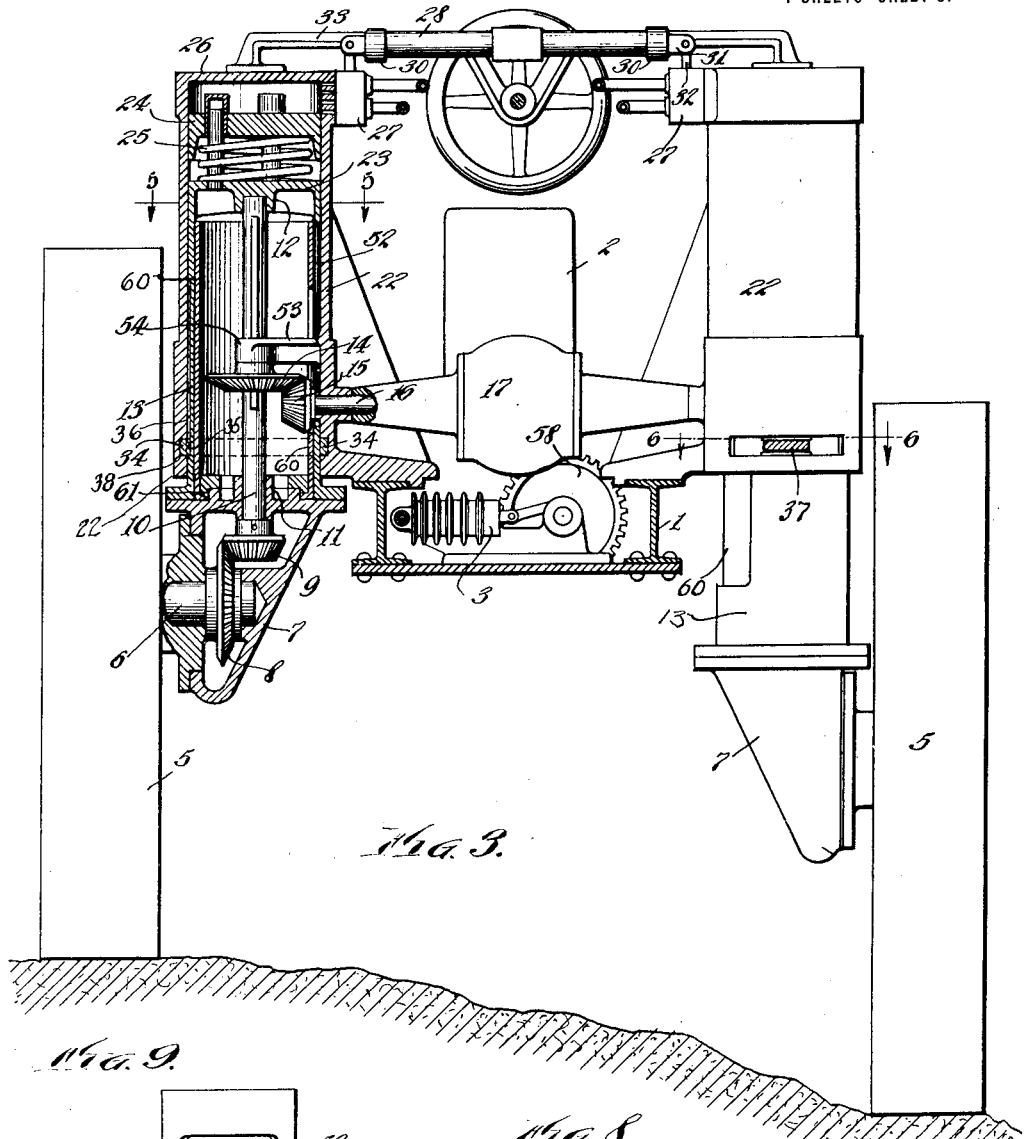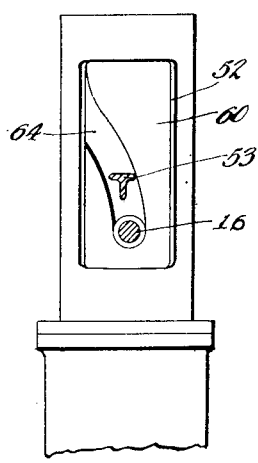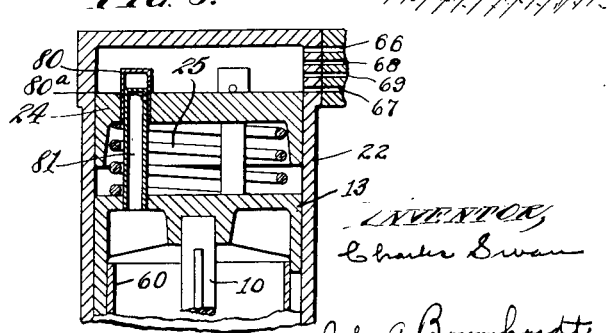

C. SWAN.
COMBINED LEVELING AND CUSHIONING DEVICE FOR TRACTION ENGINES.
APPLICATION FILED NOV. 17, 1919.

1,348,333. Patented Aug. 3, 1920.
4 SHEETS—SHEET 4.

UNITED STATES PATENT OFFICE.

CHARLES SWAN, OF CLEVELAND, OHIO.

COMBINED LEVELING AND CUSHIONING DEVICE FOR TRACTION-ENGINES.

1,348,333.     Specification of Letters Patent.     Patented Aug. 3, 1920.

Application filed November 17, 1919. Serial No. 338,712.

*To all whom it may concern:*

Be it known that I, CHARLES SWAN, a citizen of the United States, residing at Cleveland, in the county of Cuyahoga and State of Ohio, have invented certain new and useful Improvements in Combined Leveling and Cushioning Devices for Traction-Engines, of which the following is a specification.

This invention relates particularly to agricultural and other tractors which in order to operate efficiently require to be properly leveled when running on uneven ground and one which is so constructed as to provide a means whereby any ground working tools, such as a plow, cultivator, harrow or the like, may be conveniently applied thereto, sufficient clearance being provided so that when cultivating young and tender plants they will not become injured.

The primary object of the invention is to provide a traction vehicle with improved means combined with a steering and driving gear which will permit of so adjusting the wheels that the frame or chassis portion will maintain a level position regardless of the contour of the ground on which it is operated, said means being so constructed as to be automatic in action, therefore requiring little or not attention upon the part of the operator of the vehicle.

A further object of the invention is to provide a means whereby the wheels may be adjusted as to their height independently with respect to each other or simultaneously with respect to each other.

Still further objects of the invention are to provide a means whereby the chassis is cushioned against the customary shocks submitted thereto while traveling over a freshly plowed field or the like; said cushioning means being embodied within the leveling means, providing thereby a cushion of air.

Still further objects are the provision of a vehicle which will be of comparatively inexpensive construction and yet so constructed as to be very durable and efficient in operation.

With these and other objects in view the invention consists in certain features of construction, arrangement of parts and combination of elements which are illustrated in the accompanying drawings, fully described and pointed out in the accompanying specification and claims.

Figure 4:
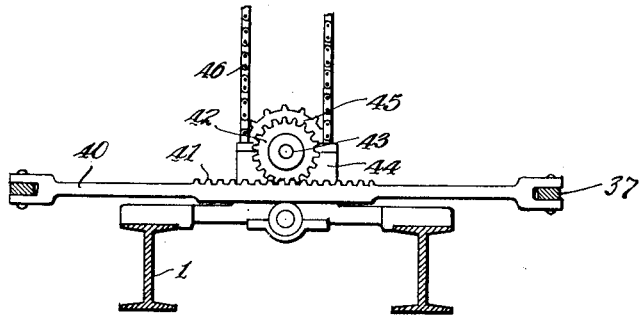
Figure 5:
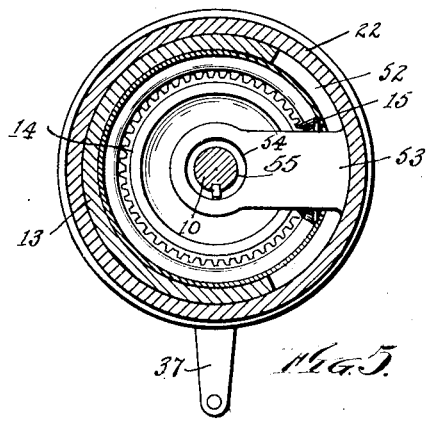
Figure 6:
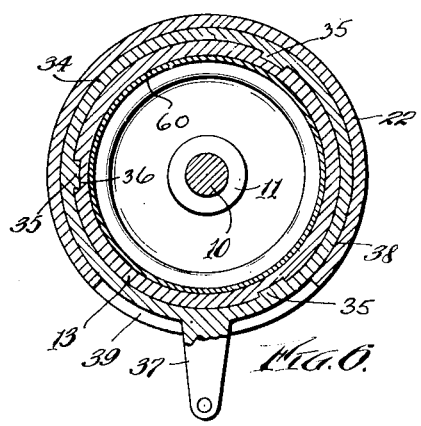
Figure 7:
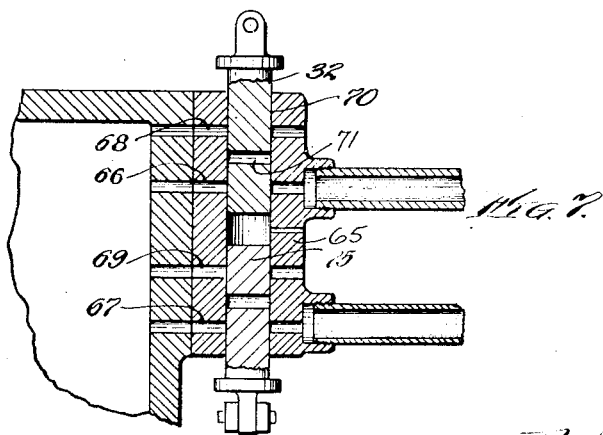

Reference being had to the accompanying drawings in which like reference numerals designate similar parts of reference throughout the various views, Figure 1 is a top plan view of a traction vehicle having embodied therein the principles above set forth; Fig. 2 is a side elevation of the same; Fig. 3 is a central section indicated by the line 3—3 of Fig. 1; Fig. 4 is a sectional detail on the line 4—4 of Fig. 2; Figs. 5 and 6 are sectional details on the corresponding lines 5—5 and 6—6 of Fig. 3; Fig. 7 is a sectional detail of the valve mechanism; Fig. 8 is an enlarged sectional detail of one of the cylinders and the piston head operating therein; and Fig. 9 is an elevation of a piston taken at right angles to the one shown in section in Fig. 3.

The device as shown in the drawings comprises a frame or chassis 1 which supports the power plant or engine 2, air compressor 3 and compressed air tank 4 upon a pair of large traction wheels 5. These wheels are mounted upon axles 6, the ends of which are securely carried in bearings provided therefor in housings 7. Between the bearings the axle has fixed thereto a bevel gear 8 having meshing therewith a bevel pinion 9 which is fixed to the end of a vertical shaft 10, and said shaft is mounted at the bottom and top in suitable bearings 11 and 12, formed respectively as a part of the housing 7 and a piston 13, presently to be described. The shaft 10 has splined to it a second bevel pinion 14 which in turn meshes with a like pinion 15 upon the driving shaft 16 of a differential mechanism 17 conveniently supported by the frame 1, and power is supplied to the differential from the engine through a driving shaft 20 which is supplied with a throw-out clutch 21.

As previously mentioned, it is at times desirable to lower one of the driving wheels sufficiently to keep the chassis in a horizontal position, and the means for this must therefore be such that the driving connection between the engine and the wheel is not disturbed and the construction about to be described permits this to be readily accomplished.

The side frames of the chassis 1 rigidly support a pair of cylinders 22, and as they are identical in construction a description of one will suffice for both. Within each of the cylinders is mounted one of the aforementioned pistons 13, which is securely bolted to the housing 7 at the bottom and at its top is provided with a head 23 which as previously described supports the top of the vertical shaft 10. The head 23 also has projecting upwardly therefrom a plurality of hollow valve members for a purpose to be hereinafter described. Above the head 23 a second auxiliary head 24 is spaced therefrom by a heavy compression spring 25, and the head 24 is furthermore provided with a number of tubular extensions which register with the aforementioned valve members.

At the top the cylinder 22 is provided with a head 26 and immediately therebeneath has a series of ports communicating with a valve 27 which controls the flow of air from the supply tank to the cylinder at the proper time, the action of the valves being controlled automatically by a fluid level in the form of a tube 28 filled with any fluid, but preferably mercury, and closed at each of its ends by caps 30. Said caps are formed with ears 31 to which are pivotally connected the actuating stems 32 of the aforementioned valves 27, the tube 28 being pivoted at its middle upon a bridge 33 supported by the heads of the cylinders 22. It will be seen that if the vehicle carriage assumes any but a horizontal position the fluid in the tube will flow to its lower end, and the weight thereof being sufficient to cause the tube to rock upon its pivot point, the stem of the proper valve will be actuated in a manner to operate the piston within the cylinder.

Means for steering the vehicle comprise a ring 34 having on its inner circumference a plurality of keys 35 operating in elongated key-ways 36 on the exterior of the piston 13 and on its outer circumference an operating arm 37. This ring is confined within an annular recess 38 formed in the lower end of the cylinder 22, consequently only a rotary movement of the ring is possible. The arm 37 projects through an aperture 39 in the cylinder 22 and has pivoted to its end one end of a reach rod 40, the other end of which is secured in a like manner to the arm formed on the steering ring of the other cylinder. The reach rod has lateral movement and is provided with rack teeth 41 at its middle portion, and said teeth are engaged by a pinion 42 mounted upon one end of a shaft 43 supported in a bearing 44 and at the opposite end the shaft has secured thereon a sprocket wheel 45 which is driven through a chain 46 from a second sprocket 47 upon the end of the steering wheel shaft 48 which is supported in a bearing provided therefor upon the bridge 33 and has the steering wheel 49 fixed upon its other end in a convenient manner to be operated from the driver's seat 50. Hence it will be seen that rotary or steering movement may be transmitted to the wheels through the ring and its keys operating upon the piston and due to the provision of the keys sliding within their key-ways the piston is permitted a vertical movement at all times.

The piston 13 is also provided with an enlarged opening 52 in its side wall through which extends a bracket 53 formed as part of the cylinder 22 and at its end the bracket has a boss 54 in which is an enlarged opening 55 through which the shaft 10 passes. This is provided merely as a keeper for the bevel gear 14, for it is evident that if some means were not provided therefor, the gear would not keep in engagement with its driving gear. It is evident that when the piston is at its lowermost position, as shown to the right of Fig. 3, the opening 52 is exposed, and means must therefore be provided whereby the operating parts within are excluded from the admission of dust and other substances injurious to them and for this purpose a cylindrical shell 60, open at its top and provided with a collar 61 at its bottom is rotatably secured within the piston 13, and said shell is provided with a spiral opening 64 through which the shaft 16 and bracket 53 pass. This is shown most clearly in Fig. 9 and it will be seen that as the piston is merely lowered the shell is permitted to rotate within the piston, but that if it is rotated and lowered simultaneously, the parts 16 and 53 are permitted to freely pass through the spiral opening, and, due to the shell, the opening 52 is substantially closed at all times.

Means for supplying air pressure to the tank comprises the compressor pump 3 which is constantly driven through the gearing 58 from the power shaft 20 and suitable piping as shown.

The valve for controlling the flow of air from the tank to the proper cylinder is shown in detail in Fig. 7 and comprises a body portion 65 which is secured to the outside upper end of the cylinder and is provided with inlet ports 66 and 67 and exhaust ports 68 and 69. The aforesaid plunger or stem 32 operates within a bore 70 in the body and is provided with a passage 71 which at the proper time coincides with either the inlet or exhaust ports, accordingly as the piston is to be raised or lowered. It will be noted that a second plunger or stem 75 is provided at the lower end of the body 65, the end of which may be connected to an operating lever within convenient reach of the driver, whereby to control the valves manually should the occasion occur.

Means for cushioning the vehicle from road shocks comprise the aforementioned heads 24 and springs 25 together with the valve members 80 and 81. The action of these may thus be described: Normal shocks imparted to the piston are absorbed by the springs 25 playing upon the lower portion of the heads 24, which are prevented from any further upward movement by a cushion of air confined in the cylinder head. Should the shock imparted to the piston be too great for the spring 25 to absorb, port 80ª in the valve member 81 carried by the piston head registers with the port in the valve member 80 carried by the auxiliary head 24 and thus allows a certain part of the air within the head to escape, sufficiently to allow the spring to regain its stability and assume the load.

In operation, the drive from the differential 17 and axle 16 is transmitted through the gears 15 and 14, shafts 10 and gears 9 and 8 to the wheel axles or stubs 6 and thus to the wheels and since the shafts 10 can slide up and down in the gears 14 the drive is communicated irrespective of the vertical or angular position of the wheels.

The wheels can also be turned for steering by means of the link 40 turning the pistons 13 in the cylinders 22, together with the casings 7 attached to the pistons.

When the chassis tilts in consequence of uneven ground the valve controlling tube 28 rocks on its pivot and opens the exhaust ports 68 and 69 on one side and the inlet ports 66 and 67 on the other, and the air in the cylinder 22 on the former side exhausted and permits the piston 13 on that side to slide up and lift the wheel 5 on that side, while on the opposite side additional air is admitted into the cylinder 22 and the piston 13 on that side is forced downwardly, thereby lifting the frame on that side, until the frame is level, at which time the valves on both sides close automatically by the tube 28 swinging to its original or level position. The valves 80 and 81 relieve excessive shocks in the manner described.

I claim:

1. In a vehicle; the combination of a frame, wheels at opposite sides thereof, a vertical cylinder at each side of the frame, a piston working in each cylinder and supported by a wheel, and means to admit fluid pressure to one cylinder and exhaust it from the other to lower and raise the pistons and wheels respectively.

2. In a vehicle the combination of a frame, wheels at opposite sides thereof, a vertical cylinder at each side of the frame, a piston working in each cylinder and supported by a wheel, and means to admit fluid pressure to one cylinder and exhaust it from the other to lower and raise the pistons and wheels respectively said means being automatically actuated by lateral tilt of the frame.

3. The combination with a vehicle frame and wheels supporting the same, of means to level the frame, including cylinders carried by the frame, pistons working in the cylinders and supported by the wheels respectively, and means to exhaust fluid pressure from one cylinder and admit it to the other.

4. The combination with a vehicle frame and wheels supporting the same, of means to level the frame, including cylinders carried by the frame, pistons working in the cylinders and supported by the wheels respectively, and means to exhaust fluid pressure from one cylinder and admit it to the other, said means including valves automatically actuated by lateral tilt of the frame.

5. The combination with a traction vehicle frame and wheels supporting the same, of a piston supported by each wheel, a vertical fluid pressure cylinder in which each piston works, means to admit fluid pressure into each cylinder or exhaust the same therefrom, to lower or raise the pistons, and means to drive the wheels, including vertical shafts located within the pistons at the axis thereof and gearing between said shafts and the wheels respectively.

6. The combination with a traction vehicle frame and wheels supporting the same, of a casing beside each wheel, an axle fixed to the wheel and projecting into the casing, a piston fixed to each casing, a cylinder fixed to the frame and inclosing the piston, a shaft carried by the piston and geared to the axle, a gearing slidable on the shaft, a power plant including a gear meshing with each of said gears, and means to admit fluid pressure into the cylinders or exhaust the same therefrom.

7. The combination with a traction vehicle frame and wheels supporting the same, of means to level the frame by raising or lowering a wheel at either side, said means including pressure actuated pistons supported by the wheels, and a steering gear operatively connected to each piston, to turn the same and the wheel supporting it.

8. The combination with a vehicle frame and wheels supporting the same, of a vertical cylinder carried by the frame adjacent to each wheel, a piston supported by each wheel and working in one of the cylinders, said pistons having upper and lower heads, springs between the heads, and means to admit fluid pressure into or exhaust the same from the space in the cylinders above the upper heads of the pistons.

9. The combination with a traction vehicle frame and wheels supporting the same at opposite sides, of a vertical cylinder at each side of the frame, a piston supported by each wheel and working in each cylinder, a vertical shaft at the axis of each piston, said shaft being geared to a wheel at its lower end, a gear located within the piston and splined to said shaft, a power mechanism mounted on the frame and geared to said gears, and means to admit fluid pressure into or exhaust the same from the cylinders, to raise or lower the pistons.

10. The combination with a vehicle frame and wheels supporting the same, of a cylinder carried by the frame adjacent to each wheel, a piston supported by each wheel and working in said cylinder, said piston having upper and lower heads, a spring between said heads, an automatic relief valve opening through the upper head when the spring is fully compressed, and means to admit fluid pressure into, or exhaust the same from, the space between the upper head and the upper end of the cylinder.

11. The combination with a vehicle frame and vertical cylinder carried thereby, of a steering wheel, a piston supported on the wheel and movable up and down and also rotatable in the cylinder, a ring rotatable in the cylinder and having sliding engagement with the piston to permit the up and down movement of the latter, a steering gear connected to the ring to turn the same and the piston, and means to admit fluid pressure into or exhaust the same from the cylinder above the piston.

12. The combination with a traction vehicle frame and wheel supporting the same, of means to level the frame by raising or lowering a wheel at either side, said means including vertical cylinders mounted on the frame and pistons carried by the wheels and working up and down therein, said pistons being also rotatable in the cylinders, a power plant on the frame, driving means between the power plant and the wheels, including vertical shafts at the axes of the pistons, and means to turn the pistons and the wheels carrying the same, for steering.

13. In a vehicle, the combination of a frame, wheels at opposite sides thereof, a vertical cylinder at each side of the frame, a piston working in each cylinder and supported by a wheel, and means to admit fluid pressure to one cylinder and exhaust it from the other to lower and raise the pistons and wheels respectively, said means including valves controlling said fluid pressure inlet or exhaust and a pivoted tube connected to said valves and containing a fluid which will flow from one end of the tube to the other and swing the same on its pivot to operate the valves when the frame is tilted.

In testimony whereof, I do affix my signature in presence of two witnesses.

CHARLES SWAN.

Witnesses:
G. W. FROSSBURG,
JOHN A. BOMMHARDT.